United States Patent [19]

Rae

[11] 4,325,474

[45] Apr. 20, 1982

[54] SLIP FRICTION ROLLER DRIVE

[75] Inventor: George Rae, Port Hope, Canada

[73] Assignee: Rexnord Inc., Milwaukee, Wis.

[21] Appl. No.: 110,073

[22] Filed: Jan. 7, 1980

Related U.S. Application Data

[63] Continuation of Ser. No. 912,676.

[51] Int. Cl.³ .......................................... B65G 13/071
[52] U.S. Cl. ................................... 198/781; 64/30 R; 198/791; 308/20
[58] Field of Search ............... 198/781, 789, 790, 791, 198/780, 854, 910; 193/35 H; 64/30 C, 30 A, 30 B, 30 R, 23.5; 308/2 D

[56] References Cited

U.S. PATENT DOCUMENTS

| | | | |
|---|---|---|---|
| 2,602,536 | 7/1952 | Eggleston | 198/781 X |
| 3,381,798 | 5/1968 | Korhylak | 198/854 X |
| 3,756,042 | 9/1973 | Heth et al. | 64/30 C |
| 4,006,815 | 2/1977 | Werntz | 198/781 |

Primary Examiner—Bruce H. Stoner, Jr.
Assistant Examiner—Douglas D. Watts
Attorney, Agent, or Firm—Aaron L. Hardt; Vance A. Smith

[57] ABSTRACT

A slip friction drive for powered roller conveyor apparatus which minimizes coupling of forces between the driving engagement and the bearing surfaces and additionally provides an adjusting means for compensating for the varying frictional forces caused by changing loads.

2 Claims, 4 Drawing Figures

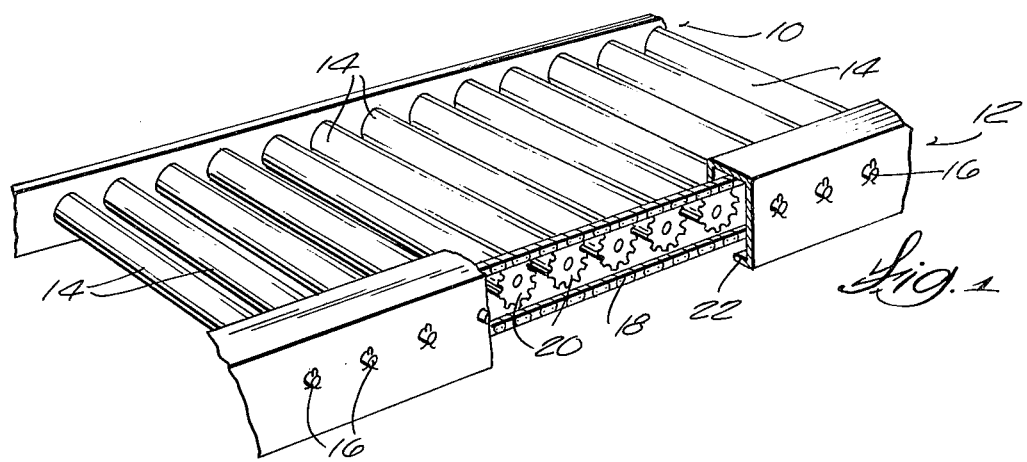
Fig. 1
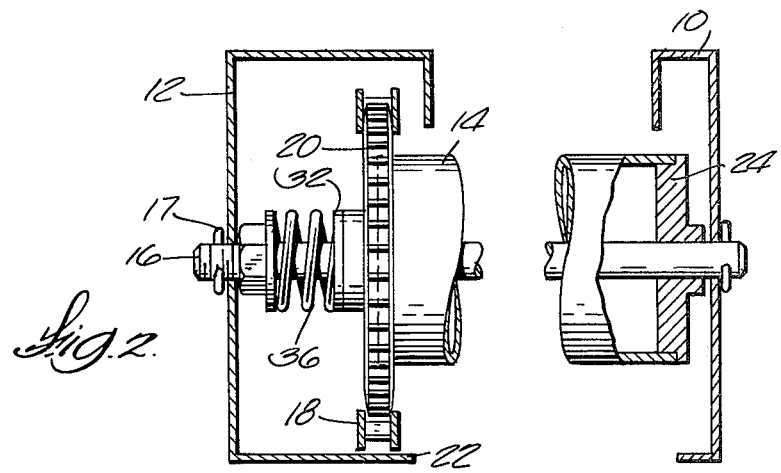
Fig. 2
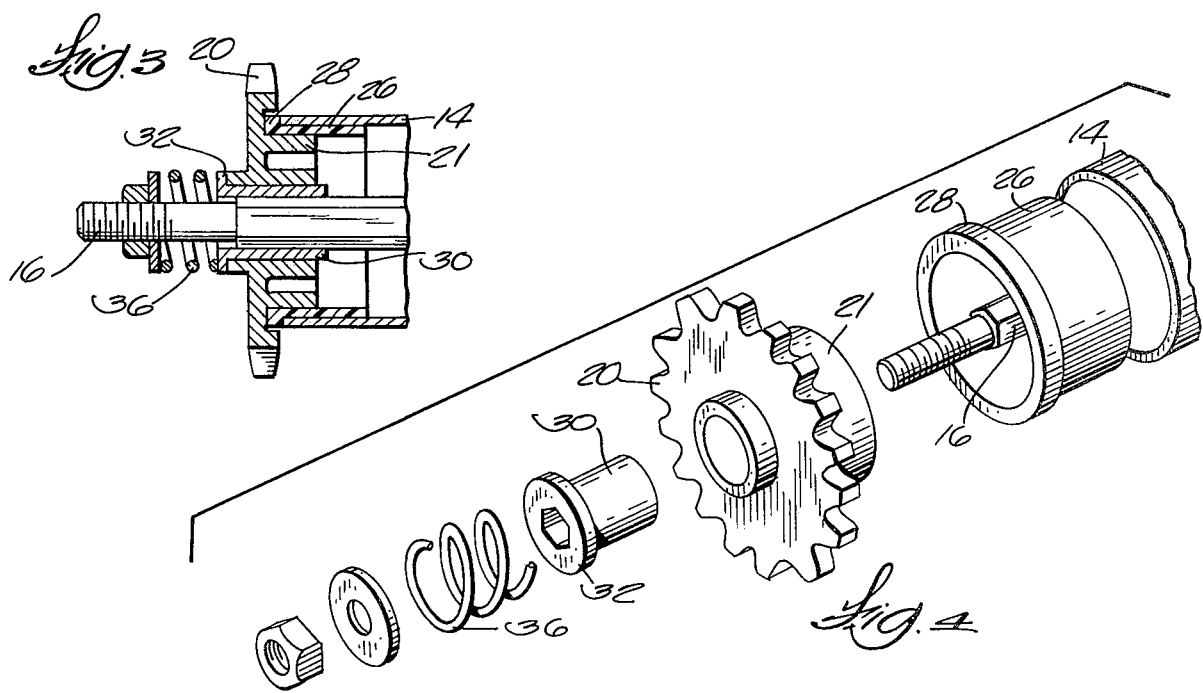
Fig. 3
Fig. 4

SLIP FRICTION ROLLER DRIVE

This is a continuation of application Ser. No. 912,676, filed June 5, 1978, now abandoned.

BACKGROUND OF THE INVENTION

This invention relates to conveying apparatus of the powered roller type in which the rollers are individually driven.

The use of slip drive devices in roller conveyor apparatus are well known in the industry. Examples are found in U.S. Pat. Nos. 2,976,981 and 4,006,815. For example, the former discloses a sprocket driven roller in which the sprocket drives the roller by virtue of the frictional forces between the hub of the sprocket and the roller. As the line pressure of the loads increase on the surface of the rollers and provide a counter-torque force, the sprocket being constantly driven begins to slide within the sleeve and accumulation occurs.

The advantages of a slip drive become very important in environments requiring or exposing the surfaces of the rollers to objects which may become lodged between rollers. Damage to the object or rollers could result when roller is positively driven by the driving means. Having the slip function designed into the apparatus minimizes the damage since the counter-torque imposed by the jamming articles overcomes the torque due to the frictional force and the roller becomes stationary.

The present invention provides additional advantages to a slip frictional drive as will be understood by reading the ensuing description. The simplicity of the invention will also be evident.

SUMMARY OF THE INVENTION

Each roller of the improved apparatus is supported at one end in a manner similar to conventional rollers of the prior art. That is, conventional rollers are in the form of a cylindrical sleeve. A hub bearing assembly is housed within the sleeve and caps one end thereof, providing rotational support at that point to the sleeve about a stationary axle. The bearing assembly at the other end of the roller is of the slip friction type and comprises a plurality of elements. First, an outer bearing element having an outer diameter dimensioned closely with respect to the inner diameter of the roller is press-fitted within the roller. Thus, the outer bearing member is keyed to and rotates with the sleeve. A flange of the outer bearing element has an outer diameter equal to or slightly greater than the outer diameter of the roller sleeve and fits snugly against the sleeve mouth and around its circumference. A driven element which has a disc-like portion and annular cylindrical extension abuts the flange of the sleeve bearing element and fits within the inner diameter of the sleeve, respectively. An inner bearing element is keyed to the stationary axle and is positioned between the cylindrical extension of the driven element and axle.

In ordinary situations, the element being driven by a chain or belt or the like rotates about the inner bearing element and, by virtue of friction between the driven element and outer bearing element, causes the roller sleeve to also rotate. When a force opposing rotation of one of the rollers occurs, thereby providing a torque counter to the frictional force torque about the axis of rotation. The roller sleeve will become stationary if the counter torque becomes greater than the frictional torque. Such a situation may occur due to line forces generated by accumulating loads or a force caused by the jamming of the roller, e.g., due to a foreign article. The driven member, however, continues to rotate.

To provide uniform rotation and wear of the bearing surfaces and ultimate better control of frictional forces, it is desirable that coupling of torques acting upon the apparatus be minimized. The present invention accomplishes this by structurally designing the driven element such that torque created by the driving means acts in a plane juxtaposed to the flange bearing surface of the outer bearing element. In the case of sprocket type driven element, the arc of the sprocket teeth defines a plane substantially coplanar with the plane of the flange surface.

To further improve the frictional force control of the present invention, a means is provided to selectively move or press the driven member against the flange of the outer bearing element. Several alternate means may be employed to accomplish this result, but a preferred means is to provide a yieldable resilient means positioned against the driven member. The yieldable resilient means may increasingly bear against the driven member which in turn causes an increase in frictional force between the driven member and flange. This function may be desireable when light loads are being carried by the rollers.

DESCRIPTION OF THE DRAWINGS:

FIG. 1 is a perspective view of the roller apparatus employing a slip drive in accordance with the present invention.

FIG. 2 is a side view of a slip drive and roller in accordance with the present invention.

FIG. 3 is a side section view of a slip drive in accordance with the present invention.

FIG. 4 is an exploded perspective view of a slip drive in accordance with the present invention.

DETAILED DESCRIPTION OF THE PREFERRED EMBODIMENT

The roller conveyor apparatus of FIG. 1 is comprised of three major parts: a frame structure consisting of two parallel rails 10, 12; a plurality of rollers 14 mounted on axles 16 supported by rails 10, 12; and a roller drive which are here illustrated as sprockets 20 and chain 18. The power may be supplied by any motor (not shown) typically used to drive chain.

Rollers 14 and axles 16 are generally positioned horizontally between rails 10, 12 with rollers 14 providing a conveying surface to articles placed on the rollers. To prevent materials from contacting sprockets 20 and chain 18, both are positioned within a safety enclosure 22. Enclosure 22 serves both as a safety guard and lateral guide for articles being moved along the conveyor.

Each roller 14 is an elongated cylinder, usually made of metal sheet material. As seen in FIG. 2, one end of roller 14 houses a typical bearing assembly 24 mounted on axle 16. The inner race of the assembly is typically secured or keyed to axle 16 while the outer race is keyed to roller 14, thereby providing the roller 14 the ability to rotate about a stationary axle 16.

FIG. 3 depicts in side section the slip type functional bearing assembly in accordance with the present invention. As shown, there are three major elements: an outer bearing element or sleeve 26; an inner bearing element or bushing 30; and a driven element which is sprocket 20. Sleeve 26 fits tightly within roller 14 and has a flange 28 which abuts the mouth edge of roller 14. Inner bushing 30 fits over and is keyed to stationary axle 16. The key mechanism may be either through known slot arrangements in the event axle 16 is cylindrical or via geometry of bushing cross-section if the axle 16 is of the hexagonal type.

Sprocket 20 has a lateral and annular cylindrical extension 21 which fits between bearing sleeve 26 and bushing 30. Juxtaposed the wall of sprocket 20 facing roller 14 is flange 32 of bushing 30. Flange 32 facilitates insertion and removal of bushing 30 and may serve still another important function as described below.

Axle 16 which are stationary may be keyed by any conventional slot and torque arrangement with rails 10, 12 or retained motionless by virtue of geometry in cases where the axles have a hexagonal cross-section and are positioned within hexagonal rail slots. Cotter pins 17 seen in FIG. 2 may be employed to ensure axles 16 remain between rails 10, 12.

The composition of sleeve 26 and bushing 30 may be of any number of suitable materials but preferably should be a polymeric substance such as Delrin, a tradename of the DuPont Neymours Company. The sprocket 20 may, for example, be made of a glass filled polymeric material such as nylon. The particular composition of any of the elements, however, is not a critical feature of the invention with the appropriate features being wear resistance an amenability to friction.

When the chain 18 is driven by a motor (not shown), each sprocket 20 is turned about bushing 30. The frictional forces generated by the contact between the surfaces of sprocket 20 and flange 28, and also between the surfaces of sprocket extension 21 and bearing 30 cause rollers 14 to rotate. Increasing load obviously increases the frictional force generated between the surfaces of extension 21 and bearing 30. Contact between sprocket 20 and flange 28 is largely independent of load.

In many slip-type drive devices for conveyor roller assemblies, increasing load per roller necessitates an increasingly large counter-torque to occur before slippage results. It should be noted that frictional forces are directly proportional to the force normal to the plane of the contacting surfaces. For roller conveyors, the normal force is the load acting downward on the roller. To overcome the frictional force torque due to the load, a countertorque (e.g. line pressure of the articles or an object lodged between rollers) equal to the frictional torque must be exerted.

Although conveyor roller assemblies are ordinarily designed to handle certain magnitudes of loads, the load can still vary considerably from one lot of articles to another within a given magnitude. Often, it is desirable that the accumulating characteristics of a powered roller assembly be kept substantially constant. In other words, while the load per roller increases, it is frequently desired that accumulation occur when line pressure reaches a particular level just as would occur at lower loads per roller so that no further increase in line pressure occurs. The fragile nature of articles at high load levels may well be identical to that of articles at low load levels and too much line pressure could damage the articles. Additionally, it is prudent that safety features at least remain constant when load levels increase.

A distinct advantage of the present invention is the provision of a means to minimize changes in the frictional forces as load per roller changes. As seen in FIG. 3 and the exploded perspective of FIG. 4, the surface of sprocket 20 contacts flange 28. The contact is maintained by the pressure of a helical spring 36 mounted about axle 16 between a nut 38 and flange 32 of bearing 30 which while keyed against rotational movement relative to axle 16, may be moved longitudinally. Thus, an increase in pressure of spring 36 by movement of nut 38 against flange 32 will turn increase the pressure of flange 32 against sprocket 20 and therefore the frictional force between sprocket 20 and flange 28. This provides an additional frictional torque to the frictional torque created by frictional force between sprocket extension 21 and bearing member 26. As stated before, the former torque has the advantage of being virtually independent of load.

The precise mechanism by which pressure of sprocket 20 against flange 32 is regulated is not critical. For example, other means could be utilized such as a stationary disc member which is keyed to the axle against rotational and longitudinal movement and is adapted to receive a plurality of adjustable set screws which may bear against flange 32 or, alternatively, but less preferably, the surface of sprocket 20 itself. Additionally, the helical spring 36 could be enlarged to bear directly against sprocket 20 or an intermediate washer. It would be necessary, however, to key bearing 30 against movement along axle 16.

Under one test of circumstances, the pressure exerted by the surface of sprocket 20 may be so small as to neglibly contribute to the total frictional torque. For example, by properly choosing materials having low coefficients of friction and, when needed, providing solid lubricants, the frictional force can indeed be maintained small. This may be a very desirable circumstance when heavy loads per roller are being experienced by the conveyor assembly.

As the load per roller decreases the surface of sprocket 20 can be urged against flange 28 to increase the frictional force. Since this force is acting over a greater distance than the other force component, it should be understood that an excellent degree of control can be exerted over the total frictional torque. Thus, for light or heavy loads, the total frictional force, torque and therefore the necessary counter-torque for accumulation can be maintained essentially the same.

Another advantage is that each roller can be individually adjusted so as to create zones of varying accumulation characteristics. For example, it may be desireable to create a zone where slippage readily occurs as a safety precaution due to the easy access individuals or operators may have to the assembly in this zone. In such a zone any foreign object would readily stop movement of the rollers. While in other areas of the assembly well protected by a covering or other means, the frictional torque could be set higher.

Still another advantage may be realized when it is necessary to incline the entire roller assembly slightly to move articles to a higher position relative to an initial position. For light loads, frictional slip drives often suffer from the counter-torque created by gravity being greater than frictional torque generated by the load. Slippage occurs as the articles move up the incline. By being able to regulate and hereincrease the frictional torque, this problem can largely be minimized.

Other advantages, modifications, and variations may be understood after a reading of this description. It should be understood, however, that all such variations, advantages and modifications should be construed within the spirit of the scope of the claims.

I claim:

1. A roller conveyor apparatus comprising:
   (a) a plurality of hollow, cylindrical rollers mounted for rotary movement about stationary axles fixedly secured to spaced, side-support frames, each of said rollers having a rotary bearing assembly at one end thereof;
   (b) a chain driving means for rotating said plurality of rollers; and
   (c) a slip friction assembly having associated with each said stationary axle at the other end of its respective said roller:
      i. a hollow, elongated inner bearing member surrounding and secured to said stationary axle within said other end of said roller by means preventing rotational movement about, but permitting sliding movement along said axle by said inner bearing, said inner bearing member having a cylindrical outer surface and an annular radial flange outside said roller,
      ii. a sprocket drive member having a cylindrical hub with cylindrical inner and outer bearing surfaces, said inner bearing surface rotatably mounted on said inner bearing member with its outside in juxtaposition to said radial flange of said inner bearing member, said sprocket drive member also having a disc portion positioned outside said roller substantially perpendicular to said cylindrical hub with teeth formed on the outer periphery thereof for engagement with said chain and with an annular recess into its inner side in juxtaposition to said outer bearing surface of said hub,
      iii. a hollow, elongated cylindrical outer bearing member extending into said other end of said roller in continuous juxtaposition with and secured to the inner side of said roller, said outer bearing member having an inner diameter substantially identical to the outer diameter of the outer bearing surface of said hub and slip frictionally engageable thereon, said outer bearing member having an annular radial flange at its outer end positioned so that its outside is in juxtaposition with the bottom of said annular recess in said sprocket disc portion and slip frictionally engageable thereon and its inside is in juxtaposition with the mouth of said other end of said roller, so that said engagement of said sprocket teeth with said chain is coplanar with the interface of said sprocket disc portion and said flange portion of said outer bearing member, and
      iv. adjustable means mounted on said axle on the outside of said radial flange of said inner bearing member for selectively moving said inner bearing member flange relative to said sprocket to cause greater or lesser frictional forces to occur between said sprocket, said outer bearing member flange and said mouth of said roller,
   (d) whereby the frictional forces between each said sprocket and roller indepedent of an external force on said roller can be individually adjusted.

2. The roller conveyor apparatus defined in claim 1 and further comprising a helical spring about said axle providing adjustable resilient means for moving said inner bearing member relative to said sprocket, the inner end of said spring positioned against the outside of said flange of said inner bearing member and the outer end of said spring positioned against said adjustable means mounted on said axle.

* * * * *